United States Patent [19]
Dobias

[11] 3,967,062
[45] June 29, 1976

[54] METHOD AND APPARATUS FOR ENCODING DATA AND CLOCK INFORMATION IN A SELF-CLOCKING DATA STREAM

[75] Inventor: Joseph J. Dobias, Poway, Calif.
[73] Assignee: NCR Corporation, Dayton, Ohio
[22] Filed: Mar. 5, 1975
[21] Appl. No.: 555,520

[52] U.S. Cl. .......................... 178/69.5 R; 325/38 R; 340/347 DD
[51] Int. Cl.² .......................................... H04L 7/00
[58] Field of Search .................. 178/69.5, 66 R, 68; 325/30, 38 R, 321, 141; 307/269, 265; 340/347 DD; 328/34; 360/43

[56] References Cited
UNITED STATES PATENTS
3,629,505  12/1971  Zegers ............................. 325/30 X

*Primary Examiner*—Benedict V. Safourek
*Assistant Examiner*—Robert Hearn
*Attorney, Agent, or Firm*—J. T. Cavender; James H. Phillips

[57] ABSTRACT

A method and apparatus is described for generating a data stream incorporating a self-clocking Manchester type code. The data, originally stored in a shift register, is shifted out of the register in bi-level form with a first voltage level representing one binary value and a second voltage level representing a second binary value. The output voltage levels from the shift register are applied simultaneously to two AND gates with an inverter interposed between the shift register and one of the AND gates. Two clock pulse trains are utilized, one having a clock rate twice the clock rate of the other. The clock pulses are respectively applied to the AND gates, the outputs of which are OR'ed and applied to a flip-flop. The output pulses from the OR-gate clocks the flip-flop which toggles to provide a suitably encoded self-clocking data stream at the true and the not true outputs thereof. The output from the flip-flop is applied to a line driver for driving a transmission cable that may be of the twin co-axial type.

7 Claims, 3 Drawing Figures

ONE BIT PERIOD

METHOD AND APPARATUS FOR ENCODING DATA AND CLOCK INFORMATION IN A SELF-CLOCKING DATA STREAM

The present invention pertains to a clock and data encoding system and more particularly to a system for encoding a clock in a data stream and changing the format of the data into a bi-phase or Manchester-type code for transmission.

Communication among data processing equipment can become quite complex and expensive, particularly when the communication is in encoded digital form and when such communication is attempted to be accomplished synchronously. Obviously, simplification may be achieved by permitting the processing equipment such as processors and intelligent peripherals to communicate in asynchronous fashion. Simplification can also be achieved by serializing the communication rather than attempting parallel word or byte transfer. If the information is to be transmitted serially and asynchronously by bit stream, the information content of the stream must be derived through the utilization of a clock that is related to the information being transmitted. Further, to accommodate the volume of information being transmitted, bit rates must be quite high.

To render feasible such serial information transfer, the data being transferred may incorporate, as an integral part thereof, clocking information; such data stream being referred to as a self-clocking data stream.

One technique that lends itself to high speed data transmission, at least over relatively short lines such as in house communication between a processor and intelligent peripherals or controllers, is the utilization of a selfclocking data system incorporating a self-clocking Manchester or bi-phase coded balanced line bit stream. Utilizing Manchester or bi-phase coded bit streams, at least one voltage level transition is required for every bit time. A single voltage level change within the bit time represents one binary value while two voltage level changes represent a second binary value.

Although the use of such Manchester coded bit streams may have the disadvantage of requiring significant frequency bandwidth, the system is accompanied by substantial advantages. When high speed data transmission in serial bit form is used, for example, in excess of six megabits per second, co-axial or twin co-axial cables are called for. Line balancing (regardless of the bit pattern) is always provided since the energy transmitted during the positive-going and negative-going voltage excursions is the same. Therefore, difficult problems such as common mode rejection and ground loop returns are either eliminated or rendered significantly less important.

Bi-phase or Manchester-type codes are seldon suitable for information processing within data processing and related equipment; it is therefore necessary to re-encode the information existing in the sending equipment from the logic code being used into the bi-phase or Manchester-type code for transmission. Typically, TTL logic is used in present data processing equipment and the information coded for use with such logic must be translated into a suitable code for transmission.

It is therefore an object of the present invention to provide a method and apparatus for encoding data and clock information into a self-clocking bi-phase or Manchester-type code.

It is another object of the present invention to provide apparatus for receiving data in a logic format being utilized by data processing equipment and for re-encoding the information, together with clock information, in a self-clocking bi-phase data stream.

It is still another object of the present invention to provide a method and apparatus for encoding information into a bi-phase bit stream while adding clock information thereto for transmission over a cable.

It is still another object of the present invention to provide a method and apparatus for receiving information in a bi-level form and utilizing the information to gate clock information to provide a combined output code that is self-clocking.

These and other objects of the present invention will become apparent to those skilled in the art as the description thereof proceeds.

Briefly, in accordance with the embodiment chosen for illustration, the method and apparatus for the present invention contemplate the utilization of a shift register for storing the information to be transmitted. The shift register may typically store the information in a suitable code normally used in data processing equipment, such as a bi-level code for use with TTL logic. The information in the shift register is shifted out and applied to a first AND gate which also receives a clock input. The output of the shift register is also applied through an invertor and subsequently to a second AND gate which also receives a clock input. The first clock is provided with a rate twice that of the rate of the second clock. The voltage level of the output of the shift register therefore gates one or the other of the AND gates and therefore gates either of two clocks, one of which has a rate twice that of the other. The output of the AND gates is OR'ed and applied to a flip-flop which toggles at a rate depending on the pulse rate of the signals applied thereto. The output of the flip-flop is applied to a line driver, which in turn is connected to a suitable transmission cable. The toggling of the flip-flop inherently includes clock information while the toggle rate during any information bit time will determine the binary value being transmitted during that time.

The present invention may more readily be described by reference to the accompanying drawings in which.

Figure 1:
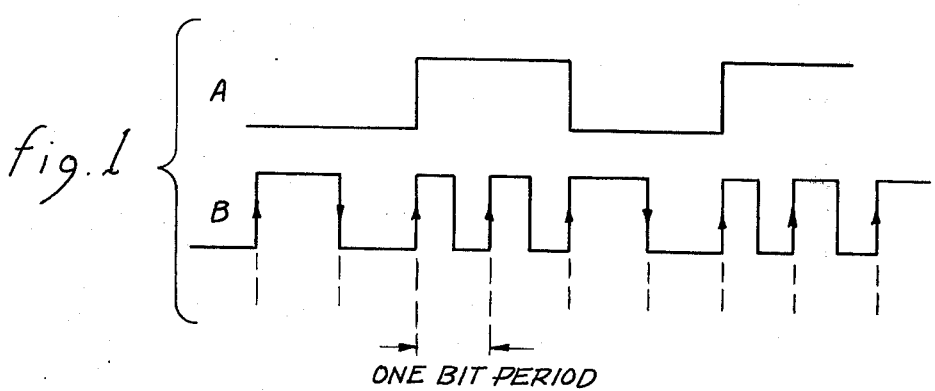
FIG. 1A is an exemplary wave form chosen to illustrate bi-level coded information and FIG. 1B is an exemplary wave form useful in describing the bi-phase or Manchester code signal pattern in relation to the bi-level code of the wave form of FIG. 1A.

Referring now to FIG. 1, the wave form A shown therein represents a typical bi-level wave form utilized in data processing. The information content in the wave form is derived through the level of the voltage existing during a bit period. Assuming that the lower voltage level is arbitrarily assigned a value of binary "0", and the higher voltage level is arbitrarily assigned the value of binary "1", it may be seen that starting from the left of wave form 1A, the encoded information may be represented in a binary form as 00110011. The corresponding binary information may be contained in a Manchester-type code as shown in wave form 1B. It may be noted that although wave form 1B utilizes two voltage levels, it is not the voltage level but rather the transitions in voltage level which determine the information content contained within a bit period. For example, while wave form 1A remained at a lower voltage level for two bit periods, indicating two successive binary zeros, wave form 1B contained only a single voltage level transition for the first bit period and another, but single, voltage level transition for the second bit period to indicate a binary zero in both bit periods. During the third and fourth bit periods, wave form 1A merely assumed a higher voltage level indicating the existence of the binary "1" in both periods. Wave form 1D on the other hand indicated the existence of a binary "1" during the corresponding bit period by providing two voltage level transitions during each bit period.

Similarly, the seventh and eighth bit periods, each containing a binary "1", are represented simply by a higher voltage level in wave form 1A, while in wave form 1B each bit period is accompanied by two voltage level transitions. Information in the form represented in wave form 1A may be re-encoded into a self-clocking Manchester-type or bi-phase wave form of 1B through the utilization of the method and apparatus of the present invention.

Figure 2:
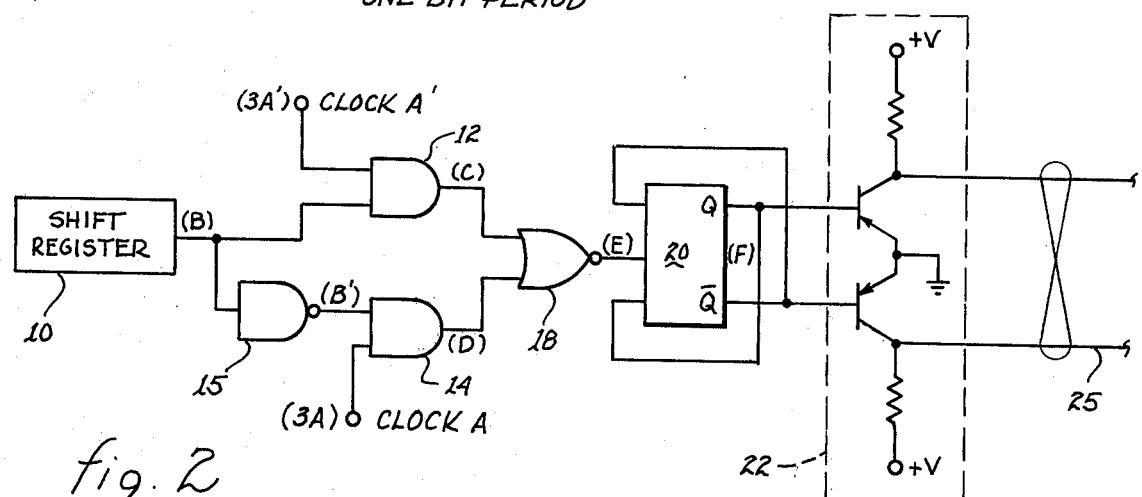
FIG. 2 is a schematic block diagram useful in describing the method and apparatus of the present invention.

Referring now to FIG. 2, a shift register 10 is shown which may contain information in an appropriate code such as that represented by the wave form 1A of the FIG. 1. The output of the shift register is applied to an AND gate 12 which also receives at an input thereof, a clock pulse train indicated as "Clock A'". The output of the shift register 10 is also applied to an AND gate 14 through an invertor 15. The AND gate 14 also receives a clock pulse train at another input thereof and is indicated in FIG. 2 as "Clock A". The outputs from AND gates 12 and 14 are applied through an OR-gate 18 to a flip-flop 20. The flip-flop 20 is shown connected in a "toggling" configuration wherein successive input pulses will cause the outputs therefrom to alternately become high or low.

Flip-flop 20 is shown having a true output "Q" and a not true output "$\overline{Q}$". As the input pulses are applied thereto, the flip-flop will successively cause the output "Q" or "$\overline{Q}$" to become high while the next succeeding input pulse will cause the same output to become low and the opposite output to become high.

The outputs "Q" and "$\overline{Q}$" of the flip-flop 20 are applied to a line driver 22 to provide suitable driving capability for transmission of the resulting pulse train over a co-axial or twin co-axial cable 25. The block diagram of FIG. 2 incldes references letters in parentheses which refer to wave forms shown in FIG. 3, corresponding to the wave forms present at the location in the diagram of FIG. 2.

Figure 3:
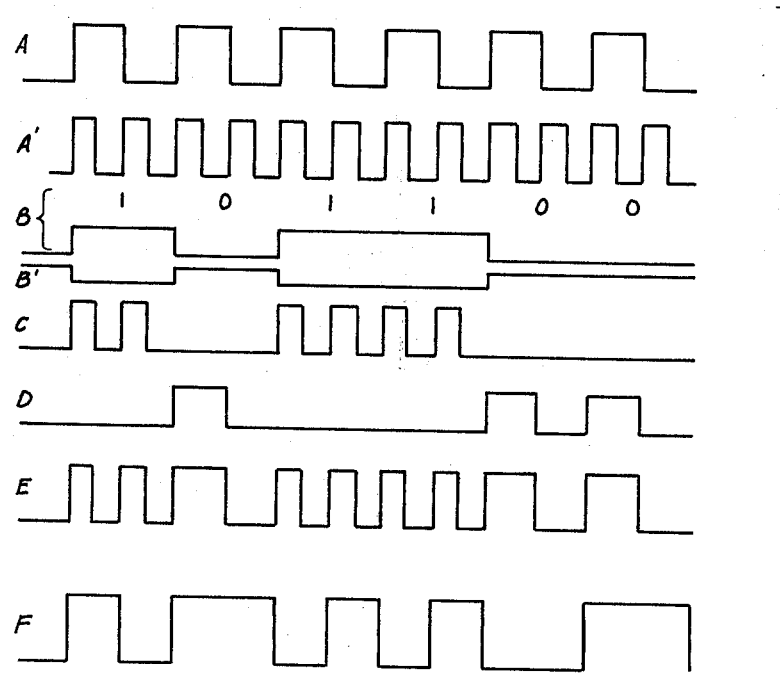
FIGS. 3A through 3F are wave forms showing timing and signal level information of various signals present in the schematic block diagram of FIG. 2.

Referring now to FIG. 3, wave form A illustrates a clock wave form having a predetermined pulse rate. Wave form A' represents a second clock pulse wave form having a pulse rate twice that of wave form A. Clock A is applied to the AND gate 14 while the clock A' is applied to the AND gate 12. Thus, by utilizing two clock frequencies, clocking information is automatically included in the resulting output while the number of voltage frequencies within a bit period is determined by whichever clock is utilized during that bit period. The information contained in the register 10 is shifted out and is shown by wave form B and is assumed to contain the binary information 101100. It may be seen that the code utilized in the shift register is a simple bi-level code as described in connection with FIG. 1. The output of the shift register as shown by the wave form B is applied directly to the gate 12; the output is also applied to an invertor 15 which inverts the voltage levels of the wave form as shown in wave form B'.

Thus, the information being shifted out of the shift register 10 is utilized to enable gates 12 and 14 in accordance with the binary information content of each bit period. That is, if a binary "1" exists during a bit period, gate 12 is enabled; similarly, if a binary "0" occurs during a bit period, gate 14 is enabled. When a binary "1" is contained within the bit period and is to be transmitted utilizing the bi-phase code, gate 12, having been enabled by the high voltage level from the shift register during that bit period, permits the high frequency Clock A' to be applied to the OR-gate 18. Referring to wave form C, it may be seen that the higher frequency Clock A' is gated during the first, third and fourth bit periods, and is inhibited during the second, fifth and sixth bit periods.

When a binary "0" is contained within a bit period, gate 14 is enabled by the inverted voltage level of the shift register output; therefore, the lower frequency Clock A is gated to the OR-gate 18. Referring to wave form D, it may be seen that the lower frequency Clock A has been inhibited during the first, third and fourth bit periods and has been gated to the OR-gate 18 during the second, fifth and sixth bit periods. The wave forms C and D are combined at the output of the OR-gate 18 and are shown at wave form E.

As stated previously, flip-flop 20 toggles twice for two input pulses and once for one input pulse. Stated differently, the flip-flop 20 changes state for each input pulse. The voltage between the true output "Q and not true output "$\overline{Q}$" is shown as wave form F. Referring to wave form F, it may be seen that during the first bit period, the voltage level incurs two voltage level transitions; similarly, during the third and fourth bit periods, the voltage level incurs two voltage level transitions. During the second bit period, the voltage level experiences only a single voltage level transistion; similarly, a single voltage level transition occurs during the fifth and sixth bit periods. Wave form F therefore represents a bi-phase self-clocking data stream, wherein information content is represented by voltage level transitions and which may be conveniently applied to a line driver such as that shown at 22 in FIG. 2 for transmission on a suitable cable.

The invertor, AND gates, Or-gate and flip-flop shown in FIG. 2 may take any of several well known forms, each of which is well within the skill of those familiar with the data processing art. Similarly, clock pulse trains referred to as Clock A and Clock A' may be generated through the use of well known techniques which need not be described.

I claim:
1. A method of encoding and transmitting binary information, represented by a wave form having a first voltage level during a bit period indicating one binary value and a second voltage level during a bit period indicating a second binary value, into a bi-phase self-clocking bit stream, comprising the steps of:
   a. providing a first clock pulse train having a first pulse rate;
   b. providing a second clock pulse train having a second pulse rate;
   c. applying to a common terminal either said first clock pulse train when said wave form is at said first level during a bit period or said second clock pulse train when said wave form is at said second level during a bit period; and d. providing an output wave form having two voltage levels and including two voltage level transitions during said bit period when said second clock pulse train occurs at said terminal and having a single voltage level transition during said bit period when said first clock pulse train occurs at said terminal.

2. The method of claim 1, including the step of providing a second clock pulse train at a bit rate twice the bit rate of said first clock pulse train.

3. The method of claim 1, wherein the step of providing an output wave form includes providing voltage level transitions in said wave form occurring at only the beginning and mid-point of each bit period.

4. Apparatus for encoding and transmitting binary information, represented by a wave form having a first voltage level during a bit period indicating one binary value and a second voltage level during a bit period indicating a second binary value, into a bi-phase self-clocking bit stream, comprising:

a. storage means for temporarily storing binary information for transmitting said information in the form of said wave form;

b. a first gate connected to said storage means for receiving said wave form, said gate being enabled by said first voltage level;

c. means connected to said storage means for receiving said wave form and for changing said first level to said second level and changing said second level to said first level;

d. a second gate connected to said means connected to said storage means, said second gate being enabled by said second voltage level when said second voltage level has been changed to said first voltage level;

e. means for applying a first clock pulse train to said first gate;

f. means for applying a second clock pulse train to said second gate;

g. said first clock pulse train having a pulse rate twice that of said second clock pulse train; and h. a flip-flop connected to said first and second gates for receiving clock pulses therefrom, said flip-flop having first and second output voltage levels, said flip-flop changing state to provide an output voltage level transition from one level to another in response to each clock pulse received from said gates.

5. The apparatus claimed in claim 4, including a line driver connected to receive said output wave form for driving a transmission cable.

6. Apparatus for encoding and transmitting binary information, represented by a wave form having a first voltage level during a bit period indicating one binary value and a second voltage level during a bit period indicating a secondary binary value, into a bi-phase self-clocking bit stream, comprising:

a. a shift register for temporarily storing binary information and for transmitting said information in the form of said wave form;

b. a first AND gate connected to said shift register for receiving said wave form, said AND gate being enabled by said first voltage level;

c. an inverter connected to said shift register for receiving and inverting said wave form;

d. a second AND gate connected to said inverter for receiving said inverted wave form, said second AND gate being enabled by said second voltage level when said wave form is inverted;

e. means for applying a first clock pulse train to said first AND gate;

f. means for applying a second clock pulse train to said second AND gate;

g. said first clock pulse train having a pulse rate twice that of said second clock pulse train;

h. an OR-gate connected to said first and second AND gates; and i. a flip-flop connected to said OR-gate for receiving clock pulses from said first and second AND gates, said flip-flop having first and second output voltage levels, said flip-flop changing state to provide an output voltage level transition from one level to another in response to each clock pulse received from said AND gates.

7. The apparatus of claim 6, including a line driver connected to receive said output wave form for driving a transmission cable.

* * * * *